G. C. JAYNE.
FILTER.
APPLICATION FILED AUG. 19, 1916.
1,201,302.
Patented Oct. 17, 1916.
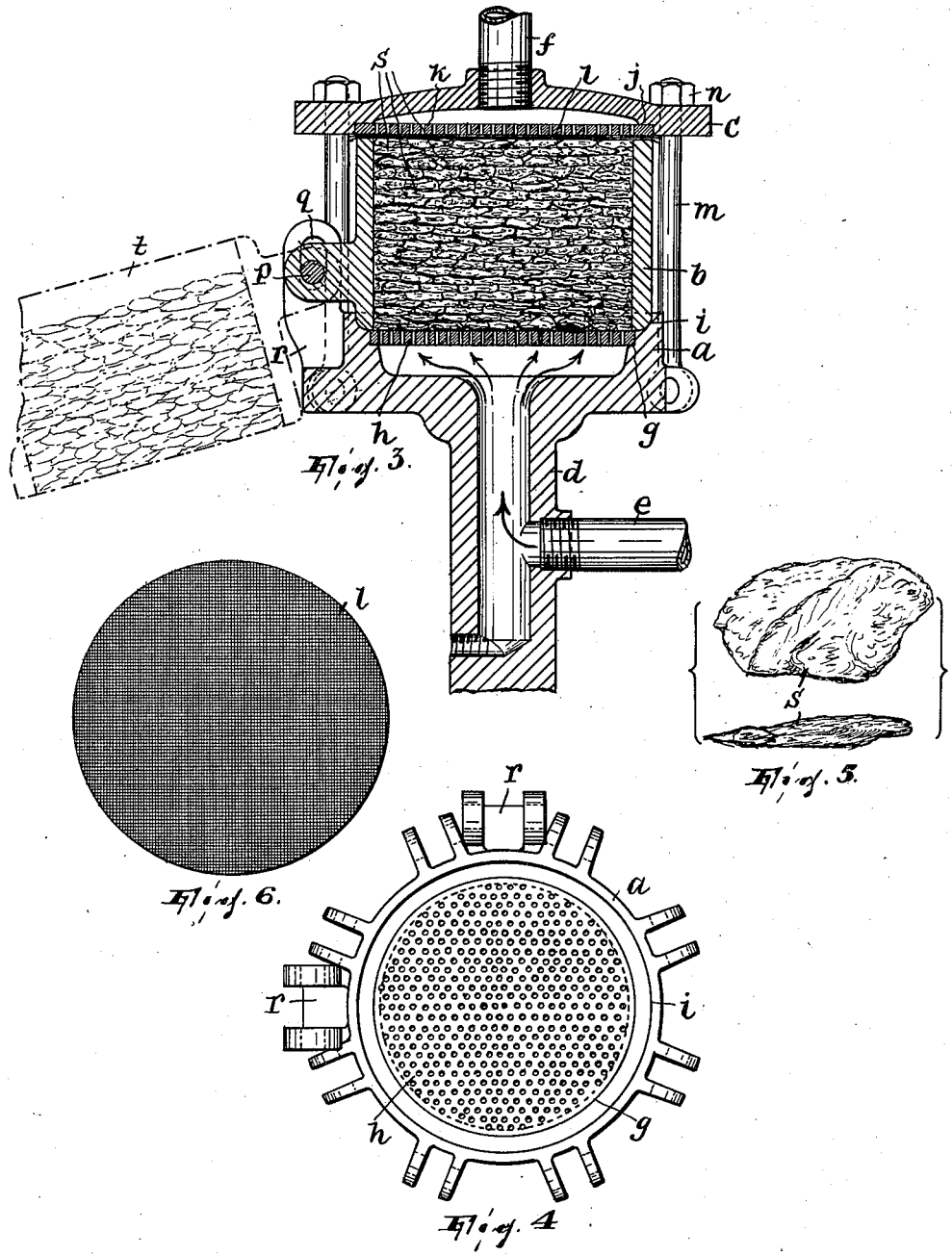
WITNESS:
Wm D Bell
INVENTOR,
George C. Jayne,
BY
ATTORNEY.

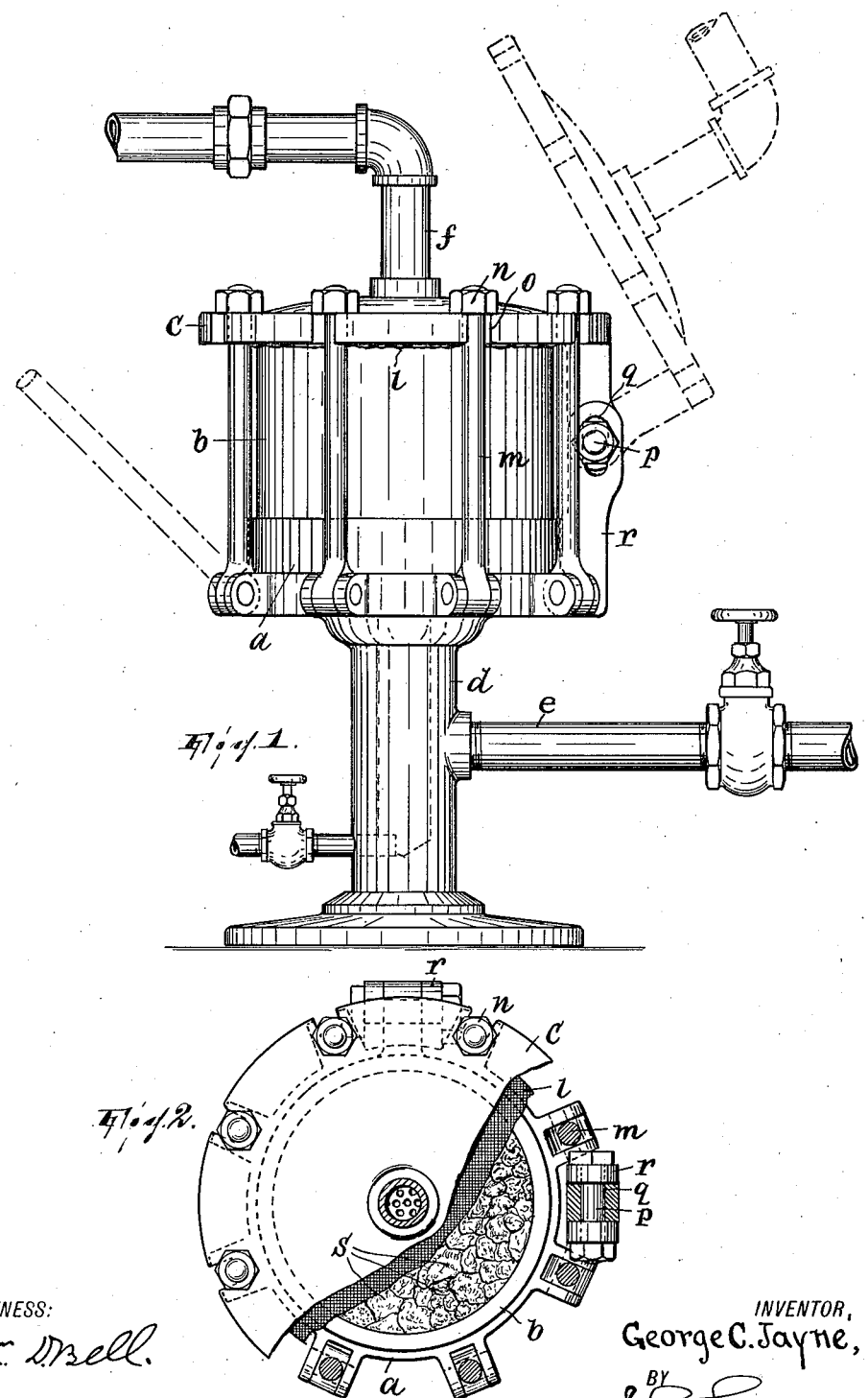

UNITED STATES PATENT OFFICE.

GEORGE C. JAYNE, OF ROCKAWAY, NEW JERSEY, ASSIGNOR OF ONE-HALF TO EDWARD KELLY, OF DOVER, NEW JERSEY.

FILTER.

1,201,302.        Specification of Letters Patent.      Patented Oct. 17, 1916.

Application filed August 19, 1916. Serial No. 115,743.

*To all whom it may concern:*

Be it known that I, GEORGE C. JAYNE, a citizen of the United States, residing at Rockaway, in the county of Morris and State of New Jersey, have invented certain new and useful Improvements in Filters, of which the following is a specification.

This invention relates to filters for liquids and it has reference particularly to filters employed for filtering water to be used in the manufacture of artificial ice, where it is necessary to remove the most minute impurities, because, though the same might not be visible in the water before freezing, after freezing they become very conspicuous in the frozen cake as a cone or pyramid of discoloration which greatly impairs the quality of the ice. Filtering media are known which as to texture (the indispensable quality is that the filtering medium be fibrous) are eminently adapted to the purpose of eliminating animal, vegetable or mineral matter of however fine character. Thus, while canton flannel or any other woven fibrous material has been found to be unsuitable principally because its interstices give it more or less the character of a sieve when wet, so that the finer particles of the impurities readily find their way therethrough, cotton batting as to texture is found perfectly adapted to the purpose. But cotton batting, or cotton in any other form, adapted to be placed in the filtering chamber in a wad or mass, has these serious disadvantages, among others, that it is readily capable of being and therefore usually is made too compact in some places and insufficiently compact in others in placing it in the filter chamber, or too compact as to one change thereof and insufficiently compact as to the next, so that the filtering is not uniform and is frequently so imperfect that discoloration develops in the frozen product; and that charging of the filter medium with foreign matter, while it may have proceeded so far as to render the filter medium no longer serviceable and to require its renewal, only in fact has affected the side thereof which is next the intake, so that the whole filter body has to be discarded when only a small part thereof is unfit for further use, which is of course a matter of considerable loss where filtering in large quantities is done and the changes are more or less frequent.

After extensive experiments with various materials in connection with the commercial manufacture of artificial ice I have discovered that cotton in the form of what is known as "linters," which are small masses of short-staple cotton taken from cottonseed after the ginning process, is perfectly adapted to the end in view as to texture, as to capacity to be deposited in the filter chamber in a manner to promote uniform density with respect to each filling of the filter chamber therewith or to different changes of the filter medium, and as to rehabilitation of the filter medium without waste thereof. I do not wish to be limited to linters as the filter body, for my invention consists broadly in employing, with any holder to form the lateral wall of the filter chamber and adapted for the removal of the used or charged portion of the filter material at one end thereof and for the introduction of fresh filter material at the other, any fibrous material in masses small enough to require several such masses side by side to form a single layer; that is to say, the inventive concept is a holder of the nature indicated containing layers of fibrous material in masses, several masses to a layer, whereby uniform compacting of the filter medium is possible and when the latter becomes charged with impurities at the intake side, the part (a layer or layers) thereof actually unfit for further filtering may be removed without removing the remainder and a fresh quantity introduced at the outlet side, the layers remaining being shifted to the intake side, so that in a succession of such changes all of the original charge becomes finally used up.

In the accompanying drawings, Figure 1 is a side elevation of the improved filter; Fig. 2 is a plan view, showing the filter, partly in section and partly broken away; Fig. 3 is a vertical sectional view, showing in dotted outline the filtering element swung to position for rehabilitating the filter body; Fig. 4 is a plan view of the filter with the top, upper diaphragm and porous sheet and filter body removed; Fig. 5 is a plan and side elevation of one of the linters; and Fig. 6 is a plan of the porous sheet.

*a* is a cup-shaped base member, *b* a cylindrical holder and *c* an inverted concavo-convex cap or cover member. Member *a* has a tubular pedestal *d* through which the fluid to be filtered passes from the supply pipe *e*; member *c* has the delivery pipe *f*.

Member *a* has an interior rabbet *g* which receives the edge of a foraminous metal plate *h*; it also has an interior rabbet *i* which receives the lower edge of the holder *b*. Member *c* has an interior rabbet *j* which receives the edge of a foraminous plate *k* underlying which and resting at its peripheral portion upon the upper edge of the holder *b* is a layer or layers *l* of porous sheet material, preferably fabric, as canton flannel.

For binding the parts *a*, *b*, *l* and *c* together so as to confine the fluid being filtered and at the same time permit access to the filter element for the purpose of rehabilitating the filter body I preferably pivotally attach to the member *a* the tie bolts *m* having nuts *n* screwed on their free ends and adapted to engage each in a radial slot *o* in the member *c*. It is also preferable, although not indispensable, that the holder *b* and the cover *c* be each pivotally connected with the member *a*, as by the pin *p* engaging in vertical slots *q* in lugs *r* upstanding from member *a* (Figs. 1 and 3).

The linters *s* are shown in Fig. 5 as of a size best qualified for a filter of several times the size of that shown in the drawings. Linters are usually flat masses of cotton fiber, and in practice I pack them into the holder *b* in successive layers, fairly compact, until the holder is full, there being several linters to a layer. Having filled the holder, which at the time of filling may be in the position shown in Figs. 1 or 3 in full lines, the cover member *c* being at that time swung into the dotted line position shown in Fig. 1, the layer or layers of canton flannel *l* are placed over the holder and the inclosed body of filter material and the cover returned to its normal position and clamped down. When the filtering operation, thereupon being performed, has proceeded to such an extent that the filter body requires to be rehabilitated the cover is again swung back and the filter element shifted to the position shown by dotted lines in Fig. 3. The linters, as to one or more layers (according to the extent to which the impurities have worked into the filter body), are then removed from the normal bottom of the holder, as indicated at *t* in Fig. 3; the filter element is then returned to its normal position, the remaining layers of linters pushed down *en masse* against the diaphragm *h*, and a fresh layer or layers of linters is introduced at the top to compensate for those removed, whereupon the canton flannel sheet or sheets is superposed and the cover *c* returned to normal position and clamped in place. In this way no waste whatever of the filter body occurs; and there is this further advantage that if only a part of the area of any layer thereof actually needs to be changed, that part and no more can be removed.

The canton flannel or equivalent sheet or sheets *l* are interposed between the filter body and the plate or diaphragm *k* for the purpose of preventing the pressure of the fluid being filtered from forcing the fibrous material of the linters into the perforations of the diaphragm and thereby to a certain extent clogging them.

Having thus fully described my invention, what I claim as new and desire to secure by Letters Patent is:—

1. In a filter, a holder through which to pass the fluid to be filtered, and a body of filter material therein consisting of layers of fibrous material in the form of several masses of such fibrous material to a layer, said holder having means to afford access to the intake and discharge sides of said body for removal of a layer or layers at one such side and introduction of a fresh layer at the other.

2. In a filter, a holder through which to pass the fluid to be filtered, the same being open at both ends, a body of filter material therein consisting of layers of fibrous material in the form of several masses of such fibrous material to a layer, and removable means to support at each of said ends the filter body including a sheet of porous material arranged at the discharge end.

3. In a filter, a holder through which to pass the fluid to be filtered, the same being open at both ends, a body of filter material therein consisting of layers of fibrous material in the form of several masses of such fibrous material to a layer, and removable means to support at each of said ends the filter body including a foraminous rigid diaphragm at each end and a sheet of porous fabric between the diaphragm at the discharge end and said body.

In testimony whereof I affix my signature.

GEORGE C. JAYNE.